Figure 1:
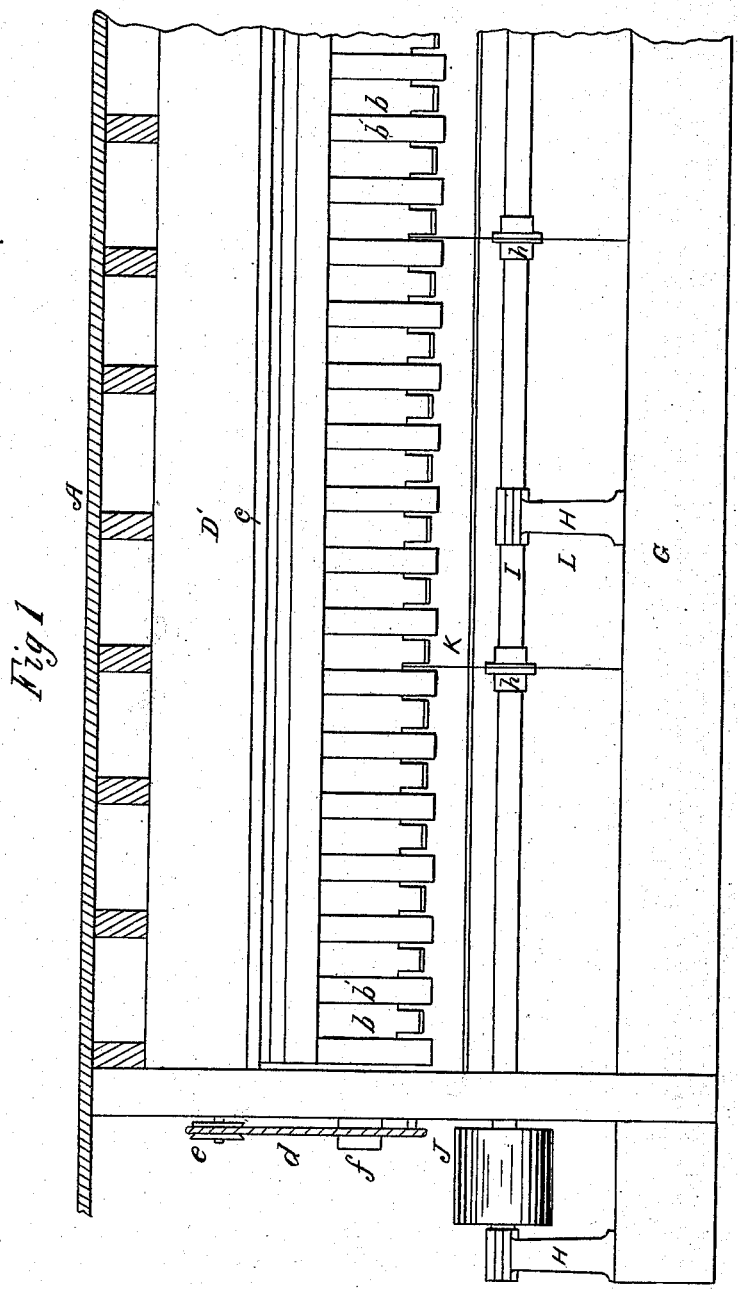

(No Model.)
2 Sheets—Sheet 1.

A. RODGERS.
CIRCULAR SAWING MACHINE.

No. 322,396.  Patented July 14, 1885.

WITNESSES
Chas. S. Jones.
J. Burroughs

INVENTOR
Alexander Rodgers
By E. T. Chandler,
Attorney (No Model.) 2 Sheets—Sheet 2.
A. RODGERS.
CIRCULAR SAWING MACHINE.
No. 322,396. Patented July 14, 1885.
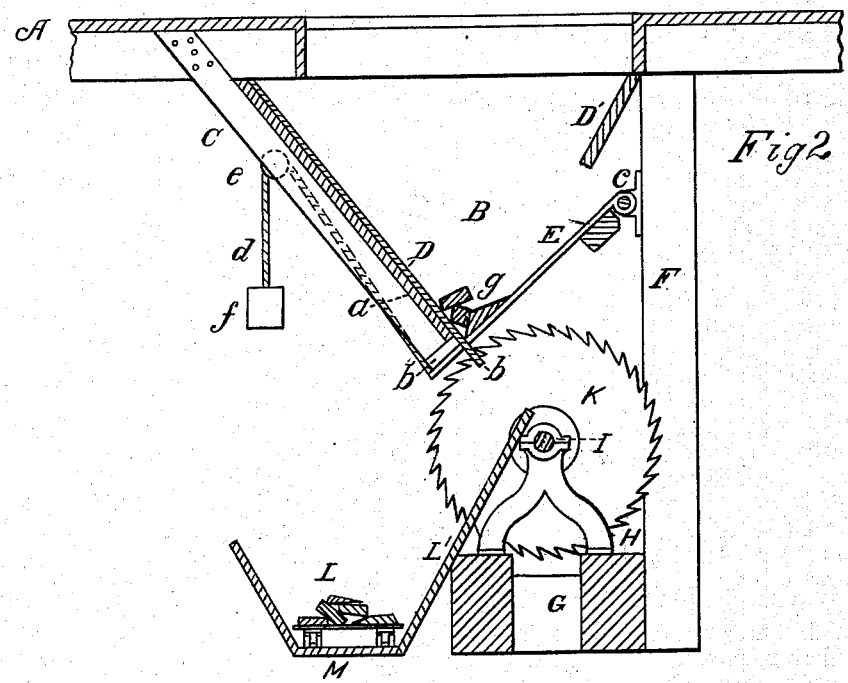
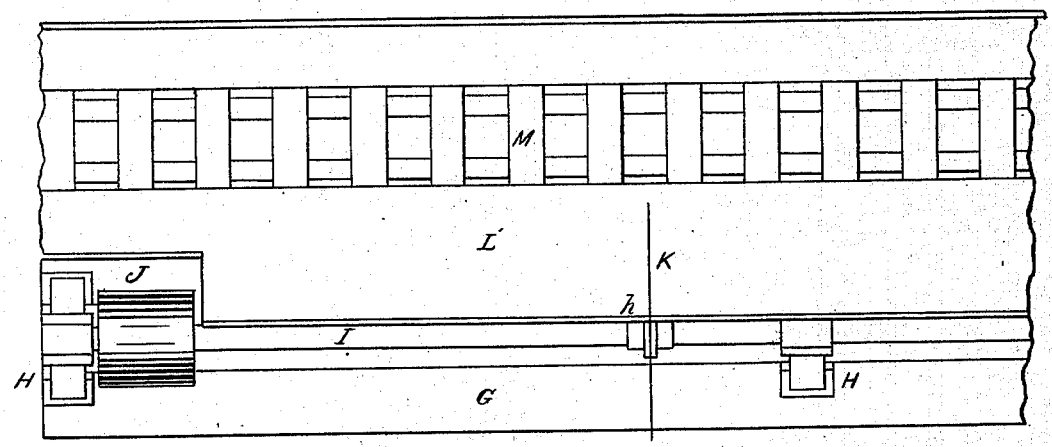
WITNESSES
Chas. S. Jones.
C. Burroughs
INVENTOR
Alexander Rodgers
By E. T. Chandler,
Attorney

UNITED STATES PATENT OFFICE.

ALEXANDER RODGERS, OF MUSKEGON, MICHIGAN.

CIRCULAR-SAWING MACHINE.

SPECIFICATION forming part of Letters Patent No. 322,396, dated July 14, 1885.

Application filed October 30, 1884. (No model.)

*To all whom it may concern:*

Be it known that I, ALEXANDER RODGERS, a citizen of the United States, residing at Muskegon, in the county of Muskegon and State of Michigan, have invented certain new and useful Improvements in Sawing-Machines, of which the following is a specification, reference being had therein to the accompanying drawings.

Figure 1 is a side elevation, partly in section, of the machine. Fig. 2 is a cross-section on the line $x\ x$ of Fig. 1, and Fig. 3 is a plan of that portion of the machine below the hopper.

This invention relates to an improvement in that class of machines employed in saw-mills for the purpose of reducing edgings and other refuse to such short lengths as will enable them to be readily moved from the mill by an ordinary endless conveyer to the refuse-burner, such division also greatly assisting in their combustion after being deposited in the burner, thus allowing a small burner to do the work of a much larger one that receives the edgings in long pieces. It also affords a speedy means of converting slabs or edgings into suitable lengths for household-fires where there may be a demand for them for use in this manner. One of the principal objects in view is to make the machine wholly automatic in its action, so that no expense is incurred for the payment of attendants, which, owing to the high prices of labor, has become a necessity in many manufacturing enterprises to enable them to be carried on at a profit; and the invention consists in a hopper provided with a swinging counterbalanced bottom placed beneath the mill-floor and operating, in connection with a series of circular saws and a conveyer, to reduce the edgings or other material to short lengths and remove the same to a place of deposit, all as hereinafter described, and then specifically stated in the claims.

In the drawings, A represents the floor of a saw-mill, and B a hopper placed below it, the floor having an opening over the hopper, through which the edgings fall into it. This hopper is preferably constructed, as shown in Fig. 2, triangular in cross-section and of sufficient length to receive the edgings or other refuse without cutting.

C represents one of the inclined frame-pieces, attached at its upper end to the floor-timbers, and with its fellows, which may be of any desired number, supporting the planks $a\ a$, which form one side of the hopper. The inner surface of this side is either wholly covered by a metallic plate, D, having its lower edge serrated, so as to form the projections $b\ b$, extending below the planks $a\ a$; or, in place of a notched plate, a series of metallic strips of the same width as the projections $b\ b$ may be secured to the planks in any suitable manner. The opposite side of the hopper is formed by the inclined plank D, secured to the floor-timbers or other proper support, but reaching only a short distance downward from the top, leaving a large space between it and the lower edge of the opposite side. This space is filled by the swinging table E, hinged to upright posts F by means of the hinges $c\ c$. The lower edge of this table is also notched in such a manner that its projecting parts $b'\ b'$ shall alternate with the projections $b\ b$ upon the other side of the hopper when the latter is in its normal state or with the opening in its bottom closed. In order to retain it in this position, a rope, $d$, is attached preferably to each end of the swinging table, and passes upward over the sheave $e$; thence down to the weight $f$. This weight is of such amount as to not only counterbalance the weight of the swinging table, but also that of a certain amount of edgings, as $g$, which may fall upon it; but whenever this weight is increased the bottom of the hopper opens and allows its contents to fall through, for a purpose which will be hereinafter explained.

Beneath the hopper is placed a suitable frame, G, which carries the supports H H, and revolving in suitable bearings on these supports is a shaft or saw-arbor, I, to which rotation is imparted by a belt from suitable pulley upon the mill-shafting to the pulley J upon the arbor. Secured at proper intervals upon this saw-arbor is a series of circular saws, K. The distance between the saws being determined by the length of the pieces into which it is proposed to cut the edgings. In order to make this adjustment conveniently, the collars, $h$, by which the saws are held in place upon the arbor, are preferably made movable, so that they may slide along the arbor and be secured at any points in its length desired. In adjusting these saws upon the arbor care must be taken to see that they are so placed as to enter the spaces between the projections b' of the swinging table E, as were they not so placed these projections would strike the saws when the table swings downward to allow the contents of the hopper to escape.

Beneath the hopper is placed a trough, L, having inclined sides, one of which sides, L', projects upward between the saws, so as to catch anything which may fall from the hopper upon them. In the bottom of this trough L runs an endless chain or conveyer, M, upon which the refuse or other material falls from the saws, and by which it is conveyed to the refuse-burner or other place of deposit.

The operation of the machine is as follows: When edgings or other material is thrown from the mill floor into the hopper B, it accumulates therein until a sufficient quantity has been received to overbalance the weights $f$. The swinging table E, forming the bottom of the hopper, then swings downward, allowing the contents of the hopper to fall through upon the saws K, by which said contents are cut into lengths corresponding to the distance between the saws upon the arbor I, after which they fall into the trough L and are carried to the place of deposit by the conveyer M.

It will be evident that this machine may be employed to cut slabs into proper lengths for lath or fire-wood by placing the saws at a suitable distance from each other upon the arbor, and that changes may be made from the specific arrangement of the several parts of the machine as heretofore described without departing from my invention.

I am aware that a sawing-machine for cutting edgings has been devised in which the material to be divided was carried to a series of saws upon a revolving arbor by rotary carriers, and that other machines, such as automatic lathes, have been provided with hoppers having a swinging bottom; but I am not aware that a machine has heretofore been constructed for cutting edgings in which they were delivered to the saws from a hopper, one side of which formed a swinging table, closing the hopper by means of a counter-weight and opening the same by the weight of the edgings or other materials to be divided.

Having thus described my invention, what I claim as new and desire to secure by Letters Patent is the following:

1. As an improvement in sawing machines, a hopper which receives the material to be divided directly from the mill-floor, one side of said hopper consisting of a swinging table, which closes the opening in the bottom of the hopper automatically when released from the weight of the material, in combination with a series of circular saws placed upon a revolving arbor beneath said hopper, and upon which saws the material falls when the table descends, substantially as set forth.

2. As an improvement in sawing machines, a hopper provided with a counterbalanced swinging table having a notched or serrated edge, which closes the opening in the bottom of said hopper, and a lining for one side of said hopper having a serrated or notched edge, which notches alternate with those of the swinging table, in combination with the series of saws mounted upon an arbor and placed beneath said hopper, as specified.

3. As an improvement in sawing-machines, a hopper provided with a swinging table which forms one side of the hopper and is operated by a counter-weight to close the bottom of said hopper, in combination with a series of circular saws placed upon a revolving arbor beneath the hopper, which saws divide the material as it falls upon them when the table swings downward, and a conveyer beneath the saws to carry away the divided edgings or refuse materials; all arranged for joint operation in the manner specified.

In testimony whereof I hereunto affix my signature in presence of two witnesses.

ALEXANDER RODGERS.

Witnesses:
DAVID McLAUGHLIN,
JENNIE RODGERS.